United States Patent [19]
Oda et al.

[11] Patent Number: 5,995,838
[45] Date of Patent: Nov. 30, 1999

[54] MOBILE COMMUNICATION TERMINAL

[75] Inventors: Takashi Oda; Shinya Usami; Hisashi Keirinbou; Satoshi Kowaguchi, all of Tokyo, Japan

[73] Assignee: NEC Corporation, Japan

[21] Appl. No.: 08/988,192

[22] Filed: Dec. 10, 1997

[30]    Foreign Application Priority Data

Dec. 11, 1996  [JP]  Japan ................................. 8-351958

[51] Int. Cl.[6] ......................................................... H04Q 7/08
[52] U.S. Cl. ........................ 455/444; 455/456; 455/31.3; 455/38.3
[58] Field of Search .................................. 455/444, 31.1, 455/31.3, 38.3, 574, 448, 449, 456

[56]          References Cited

U.S. PATENT DOCUMENTS

| | | | |
|---|---|---|---|
| 5,357,561 | 10/1994 | Grube | 455/456 |
| 5,392,452 | 2/1995 | Davis | 455/38.1 |
| 5,574,771 | 11/1996 | Driessen et al. | 455/413 |
| 5,752,163 | 5/1998 | Robinson | 455/31.3 |
| 5,828,949 | 10/1998 | Silver et al. | 455/38.3 |
| 5,870,673 | 2/1999 | Haartsen | 455/426 |

FOREIGN PATENT DOCUMENTS

| | | |
|---|---|---|
| 7-303077 | 11/1995 | Japan . |
| 2230162 | 10/1990 | United Kingdom . |
| 94 16529 | 7/1994 | WIPO . |

*Primary Examiner*—Dwayne D. Bost
*Assistant Examiner*—Erika A Gary
*Attorney, Agent, or Firm*—Ostrolenk, Faber, Gerb & Soffen, LLP

[57]          ABSTRACT

A mobile communication apparatus includes a wide area receiver and a cell transceiver. The wide area receiver which is operable at relatively low power receives a selective calling signal from a wide area base station that forms a wide one-way communication area. The cell transceiver operable at higher power than the wide area receiver performs two-way communication with a nearest cell base station that forms a two-way communication area. The wide area receiver is caused to operate at all times. However, when the mobile communication apparatus exists outside the wide one-way communication area, the transceiver is caused to start operating.

18 Claims, 5 Drawing Sheets

MOBILE COMMUNICATION TERMINAL

BACKGROUND OF THE INVENTION

1. Field of the Invention

The present invention relates to a mobile communication system and, particularly, to a mobile communication terminal and a communication method therefor which enable two-way communication with a base station.

2. Description of the Prior Art

In general, mobile terminals carried by users are battery-powered. Therefore, it is desirable that their power consumption be minimized. There has been proposed a radio telephone terminal that is intended for such reduction in power consumption in Japanese Patent Application Laid-Open No. 7-303077. This radio telephone terminal is equipped with a detector for detecting the remaining amount of battery power. If the battery remaining power is greater than or equal to a predetermined amount, location registration is performed every time the telephone terminal moves to an adjacent communicable area (cell). If the battery remaining power is smaller than the predetermined amount, the user is merely informed of non-effectiveness of location registration. Further, the time interval of reception of control signals from a base station and that of location registration are varied in accordance with the battery remaining power, to reduce the battery consumption and in turn elongate the usable time.

However, a transmission operation for location registration requires a large amount of power because of driving of a high-frequency amplifier. In the conventional radio communication terminal as described above, because it is necessary to perform, on a regular basis, transmission and reception operations for location registration with the base station, the battery is consumed at a high rate and the usable time cannot be made sufficiently long.

SUMMARY OF THE INVENTION

An object of the present invention is to provide a mobile communication apparatus which can perform two-way communication with reduced power consumption.

Another object of the invention is to provide a communication method and a mobile communication apparatus which can reduce the frequency of execution of a location registration process.

According to the present invention, a mobile communication apparatus includes a wide area receiver and a cell transceiver. The wide area receiver which is operable at relatively low power receives a selective calling signal from a wide area base station that forms a wide one-way communication area. The cell transceiver operable at higher power than the wide area receiver performs two-way communication with a nearest cell base station that forms a two-way communication area. The mobile communication apparatus further includes a determiner for determining whether the mobile communication apparatus exists within or outside the wide one-way communication area based on a received signal of the wide area receiver.

The wide area receiver is caused to operate at all times. However, when the determiner determines that the mobile communication apparatus exists outside the wide one-way communication area, the transceiver is caused to start operating.

According to another aspect of the present invention, a mobile communication system includes a plurality of mobile terminals each the same as the above mobile communication apparatus, a one-way communication system where a wide area base station forms a wide one-way communication area, a two-way communication system having a cellular service area which is formed by a plurality of cell base stations each forming a cellular two-way communication area, and a system controller connected to the one-way communication system and the two-way communication system, for controlling mobile communications in the wide one-way communication area and/or the cellular service area.

In such a system, the communication controller of the mobile terminal changes a communication channel from the one-way communication system to the two-way communication system by transmitting a channel change request to the nearest cell base station while operating the wide area receiver, and the system controller changes a communication channel from the one-way communication system to the two-way communication system when receiving the channel change request from the mobile terminal through the nearest cell base station.

Further, the communication controller of the mobile terminal changes a communication channel from the two-way communication system to the one-way communication system after disconnecting the communication with the nearest cell base station when the determiner determines that the mobile communication apparatus exists within the wide one-way communication area, and the system controller changes a communication channel from the two-way communication system to the one-way communication system when the communication between the nearest cell base station and the mobile terminal is disconnected.

During reception waiting, a control signal that is transmitted from the wide area base station is received by causing the wide area receiver with low power consumption to operate. When necessary, two-way data communication is performed with a cell base station by causing the transceiver with high power consumption to operate. Therefore, the receiving process is usually executed by using the wide area receiver with low power consumption, whereby the frequency of high power consumption processes such as the location registration process that uses the transceiver can be reduced. As a result, useless battery consumption can be reduced and hence the usable time can be elongated.

DESCRIPTION OF THE PREFERRED EMBODIMENTS

Communication System

Figure 1:
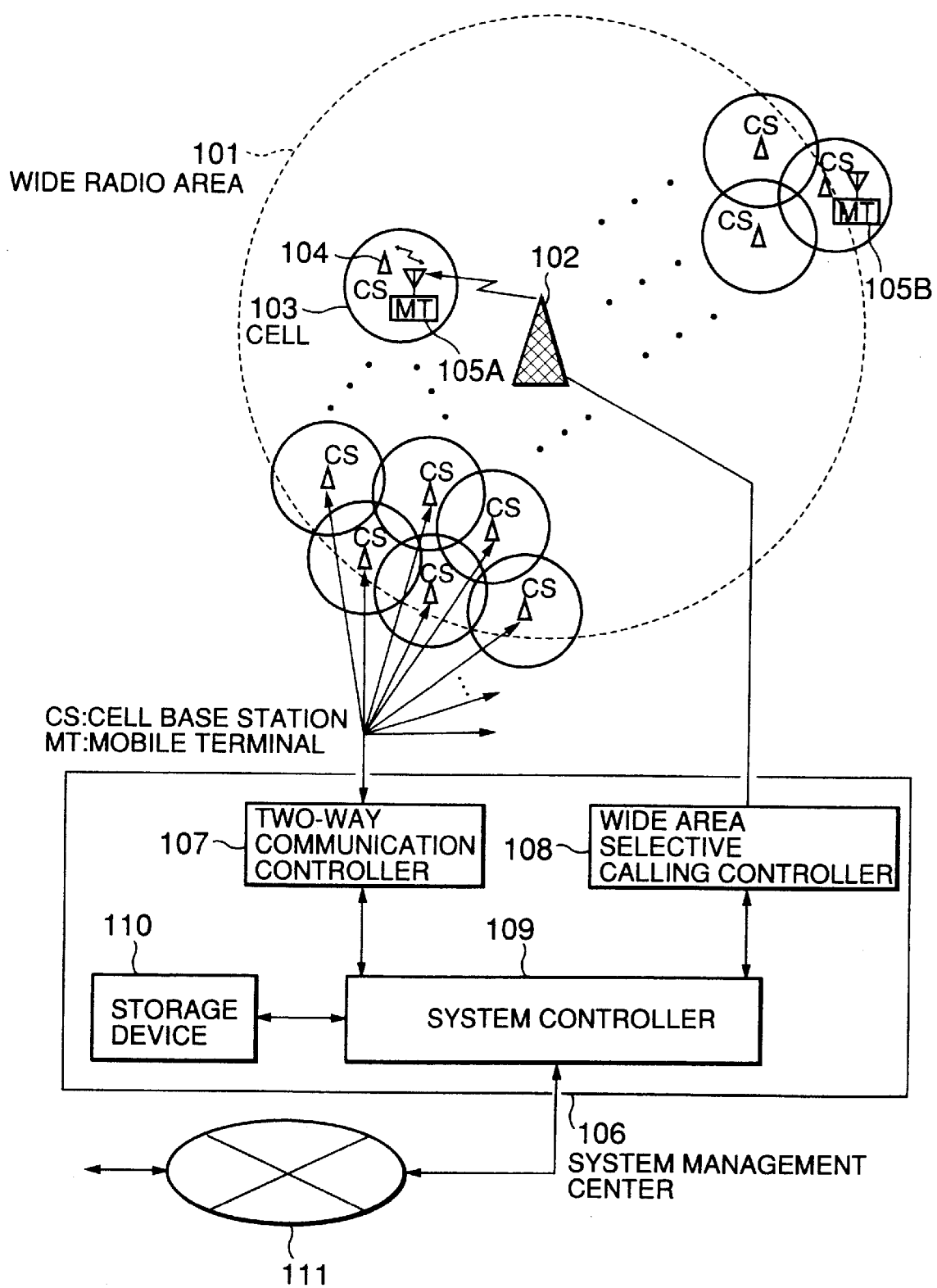
FIG. 1 is a schematic block diagram showing a system configuration of an embodiment of a communication system according to the present invention.

Referring to FIG. 1, a communication system is composed of a wide area base station 102 for forming a wide radio area 101, a plurality of cell base stations (CS) 104 for forming narrow radio areas (cells) 103 that are arranged in cellular form, and a plurality of mobile terminals (MT) carried by users. There are two kinds of communicable areas: a first radio area that belongs to both of the wide radio area 101 and the service area of the plurality of cells 103, and a second radio area that belongs to only one of those. For example, location 105A as shown in FIG. 1 belongs to both areas and location 105B exists outside the wide radio area 101 but inside the cell of the nearest cell base station 104.

The above communication system is controlled by a system management center 106. That is, the system-management center 106 unifies and controls the wide area base station 102 and the plurality of cell base stations 103. The system management center 106 is comprised of a two-way communication controller 107 that is connected to the plurality of cell base stations 103, a wide area selective calling controller 108 that is connected to the wide area base station 102, a system controller 109 for controlling the two-way communication controller 107 and the wide area selective calling controller 108, and a storage device 110 for storing data received from the respective terminals. Further, the system management center 106 can be connected, via a public network 111, to the terminal of a party to communicate with.

As described later in detail, when a certain mobile terminal MT exists in the wide radio area 101, data transfer is performed by the wide area base station 102 and an intermittent receiving operation is performed in the mobile terminal MT. Therefore, when one cell base station 103 receives a data transmission request that is directed to a particular mobile terminal, the system controller 109 transfers data to the wide area base station 102 which then transmits the data to the particular mobile terminal.

On the other hand, when a mobile terminal MT has moved to a location that is inside the cell service area of the two-way communication system but outside the wide radio area 101 or when a transmission request has occurred, the mobile terminal MT performs a location registration operation with respect to the nearest cell base station. Then, the system controller 109 effects channel switching from the wide area base station 102 to the location-registered cell base station 103 and the mobile terminal MT performs an intermittent receiving operation with the location-registered cell base station 103 and, when necessary, transmits data thereto. In doing so, the mobile terminal MT always detects control signals that are sent from the wide area base station 102. When the mobile terminal MT has re-entered the wide radio area 101, it finishes the communication with the cell base station 103. At the same time, the system controller 109 again effect channel switching from the location-registered cell base station 103 to the wide area base station 102, and the mobile terminal MT receives data from the wide area base station 102.

Mobile Terminal

Figure 2:
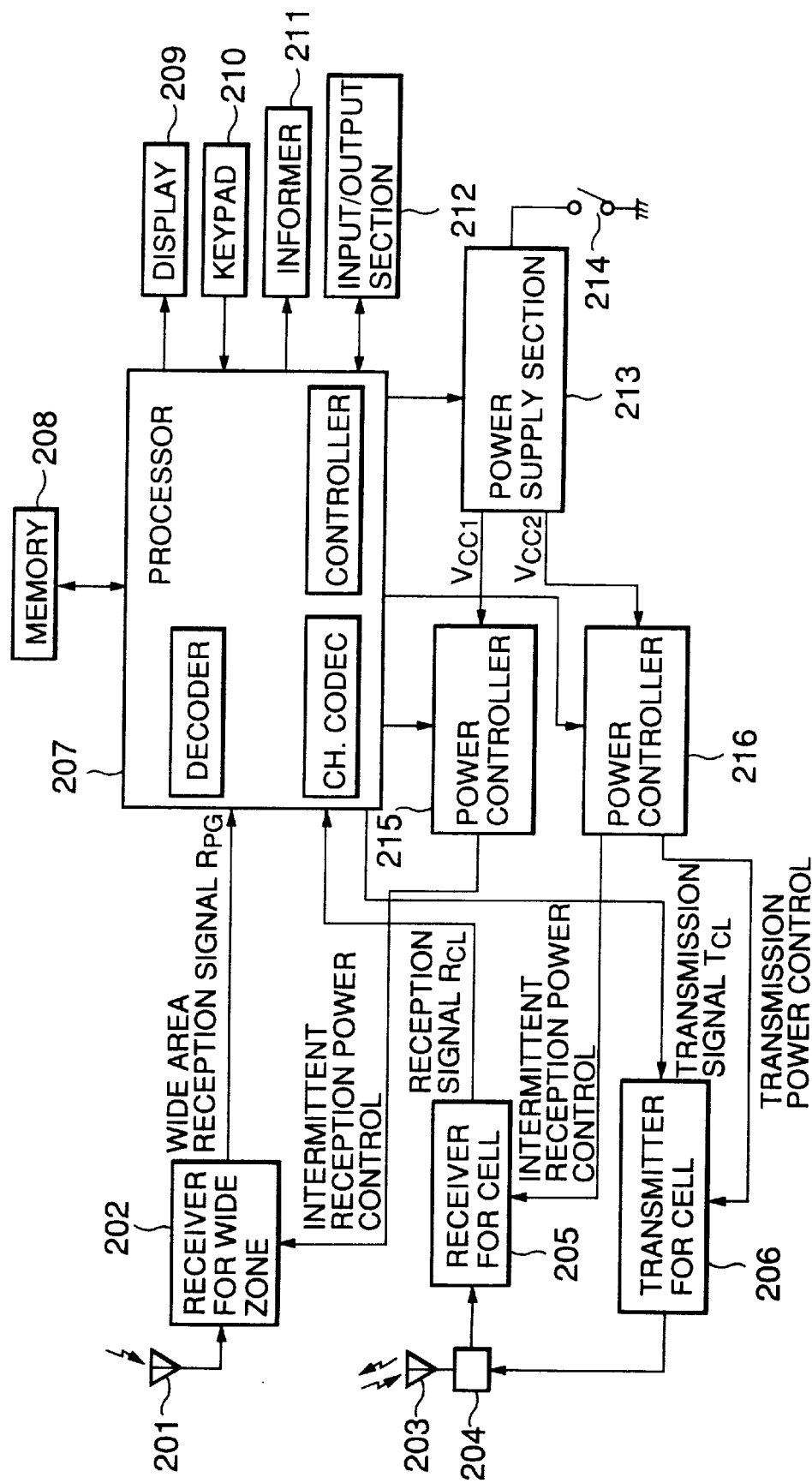
FIG. 2 is a block diagram showing an internal circuit configuration of an embodiment of a mobile communication terminal according to the present invention.

Referring to FIG. 2, an antenna 201 for receiving a radio signal from the wide area base station 102 is connected to a wide area receiver 202. An antenna 203 for communication with cell base stations 104 is connected to a receiver 205 and a transmitter 206 via an antenna switch 204. The wide area receiver 202 demodulates a radio signal that is transmitted from the wide area base station 102 and outputs a reception signal $R_{PG}$ to a processor 207. The receiver 205 demodulates a radio signal that is received from the cell base stations 104 and outputs a reception signal $R_{CL}$ to the processor 207. The transmitter 206 modulates and power-amplifies a transmission signal $T_{CL}$ received from the processor 207 and outputs a resulting radio-frequency signal to the antenna 203 via the antenna switch 204.

The processor 207 serves as a decoder for decoding the wide area reception signal $R_{PG}$ and executing a synchronization process, a detector for calculating the error rate of decoded reception data, and a channel encoder/decoder (codec) for performing channel controls on the reception signal $R_{CL}$ and the transmission signal $T_{CL}$, as well as realizes other functions and communication controls as will be described later. These functions and terminal controls as will be described later are performed by the processor 207 executing programs stored in a read-only memory (not shown). A memory 208 connected to the processor 207 stores a received message addressed thereto that is transmitted from the wide area base station 102, messages or data that is input by the user, fixed-form data to be used for making an acknowledgement of a received message, and other messages and data.

Further, a display 209 such as a liquid crystal display (LCD), a keypad 210, an informer 211 such as a speaker or beeper, and an external data input/output section 212 are connected to the processor 207. A reception message and other necessary messages are displayed on the display 209 in accordance with a user's instruction input through the keypad 210. The informer 211 makes a sound, light or vibration to the effect that a call has occurred. To perform two-way communication via a cell base station 104, reception data and transmission data are exchanged via the input/output section 212. For example, in the case of a wireless telephone, a speech reception and transmission are effected by a speaker and a microphone through the input/output section 212, respectively.

A power supply section 213 includes a battery and is turned on/off by a control of the processor 207 or by means of a power switch 214. The power supply section 213 generates different power supply voltages $V_{CC1}$ and $V_{CC2}$ (here, $V_{CC1} < V_{CC2}$) While the power supply voltage $V_{CC1}$ is supplied to the wide area receiver 202 via a power controller 215, the power supply voltage $V_{CC2}$ is supplied to the receiver 205 and the transmitter 206 for two-way communication via a power controller 216. The power controller 215 always on/off-controls the intermittent receiving operation of the wide area receiver 202 under the control of the processor 207. Further, the power controller 216 on/off-controls the intermittent receiving operation of the receiver 205 and controls the transmission power of the transmitter 206 under the control of the processor 207.

The wide area receiver 202 can operate on lower power than the receiver 205 and the transmitter 206 for two-way communication, because neither the location registration nor the channel switching is necessary unlike the case of two-way communication and the intermittent receiving operation is performed at a relatively low voltage. Therefore, the wide area receiver 202 can operate for a long time.

Communication Control

A communication operation of the above mobile communication terminal will be hereinafter described with reference to FIGS. 3–5.

Figure 3:
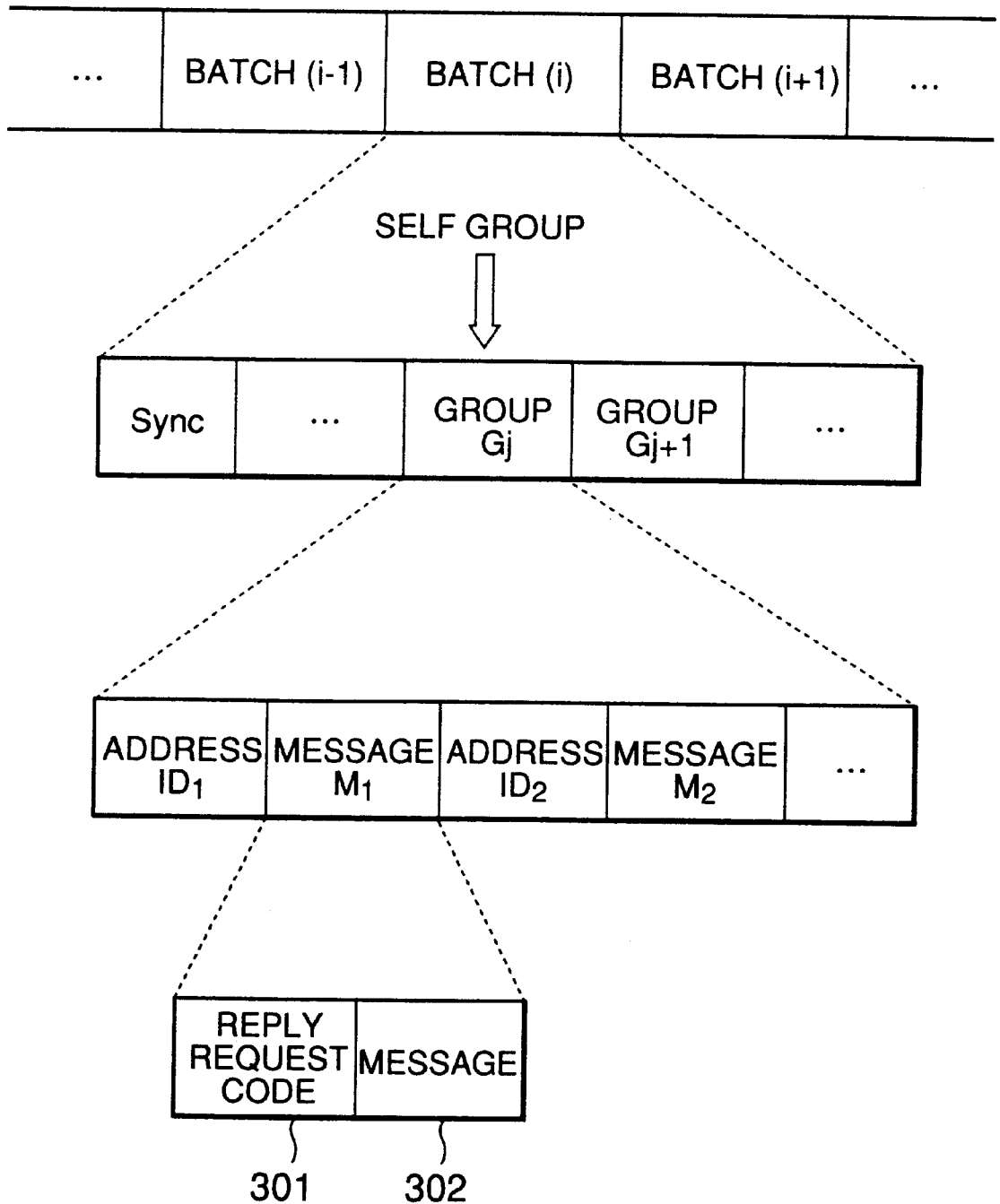
FIG. 3 is a diagram showing a format of a wide area selective calling signal in the communication system.

Assuming a wide area selective calling signal as shown in FIG. 3, which is transmitted by the wide area base station 102. The wide area selective calling signal includes a plurality of batches each including a sync signal followed by a plurality of groups. Each group is composed of a plurality of pairs of address section (ID) and message section (M). Each message section (M) includes desired message data such as a reply request code 301 and a message 302.

Figure 4:
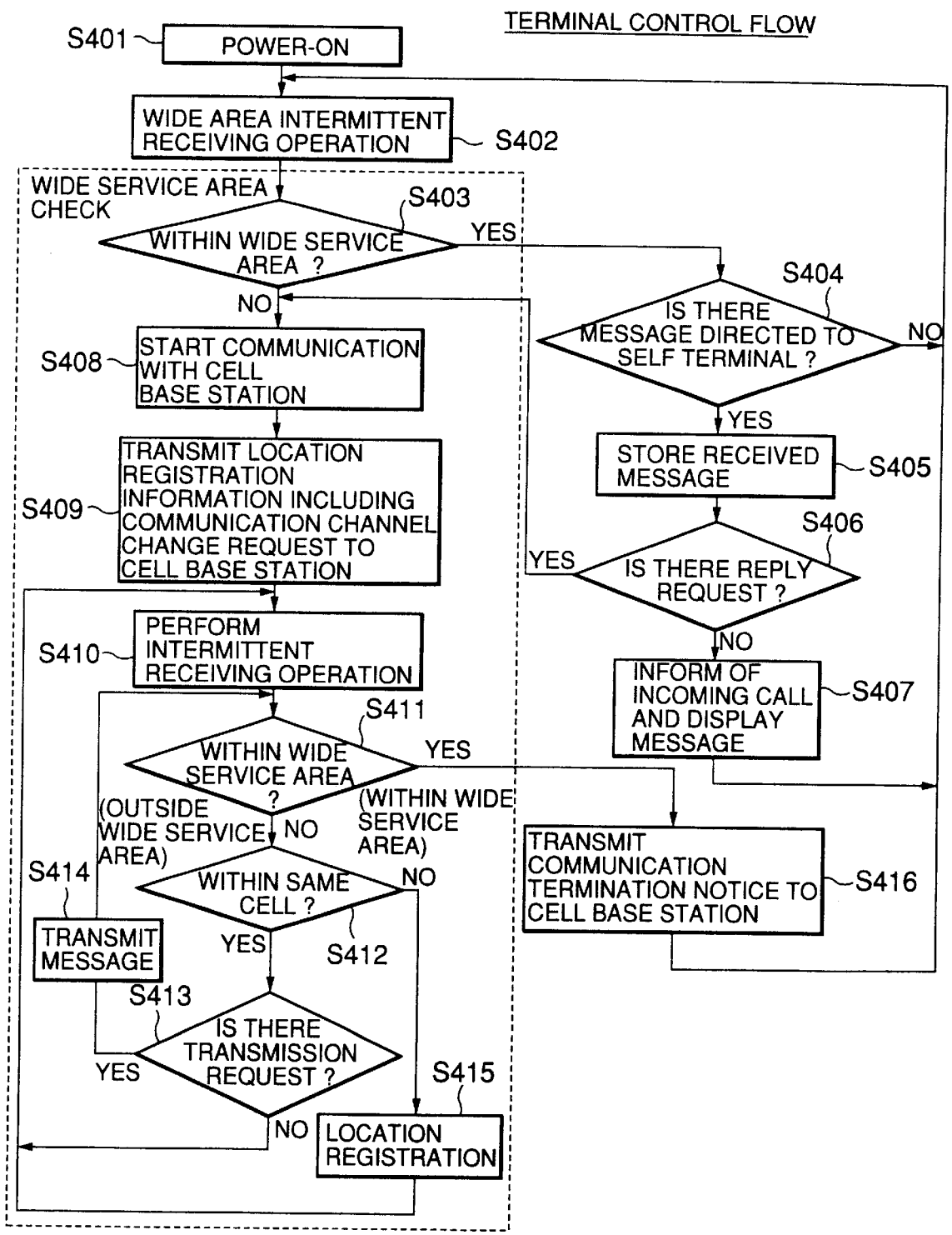
FIG. 4 is a flowchart showing an embodiment of a communication operation of the mobile communication terminal according to the present invention.

Referring to FIG. 4, when the switch 214 is closed (S401), the power supply voltage $V_{CC1}$ is supplied from the power supply section 213 to the power controller 215 which supplies power to the wide area receiver 202, whereby an intermittent receiving operation is started (S402). More specifically, the processor 207 executes a synchronization process in accordance with a reception signal that is received from the wide area base station 102. When detecting a signal including a message addressed to the terminal itself, that is, when detecting the receiving timing of its own group (see FIG. 3), the processor 207 outputs an intermittent control signal to the power controller 215 to render the wide area receiver 202 in an intermittent receiving state. The wide area receiver 202 is always in the intermittent receiving state and hence can always receive a signal from the wide area base station 102.

The processor 207 checks whether the terminal is within the wide service area 101 by monitoring the error rate of a reception signal of its own group (S403). If it is judged that the terminal is within the wide service area 101 (yes at step S403), the processor 207 checks whether the self address is included in that group (S404). If the self address is detected (yes at step S404), the processor 207 stores received data of a message section (for instance, a message section $M_1$ shown in FIG. 3) onto the memory 208 (step S405). Further it is checked whether a reply request code 301 exists in the reception message section $M_1$ (S406). In the case where the reply request is for confirmation of call acceptance, the reply request code 301 includes a reply destination address, i.e., a source address.

If there is no reply request code (no at step S406), the processor 207 drives the informer 211 to informs the user of the occurrence of an incoming call and, if the user thinks it necessary, he/she operates the keypad 210 so that the reception message 302 are displayed on the display 209 (S407). The wide area intermittent receiving operation S402–S405 is thereafter repeated whereby the wide area receiver 202 can receive data that is transmitted from the wide area base station 102 at all times.

On the other hand, if it is judged that the terminal is out of the wide service area 101 (no at step S403), the processor 207 starts a communication with a cell base station 104 by outputting a control signal to the power controller 216 so that the power controller 216 supplies power supply voltages to the receiver 205 and the transmitter 206 of two-way communication to activate those sections (S408). First, since the wide area receiver 202 is incapable of reception, the processor 207 generates a channel change request for requesting a communication channel change and causes the transmitter 206 to transmit location registration information including the communication change request to the nearest cell base station 104 (S409). The cell base station 104 that has received the location registration information performs location registration of the mobile communication terminal concerned.

Once the location registration is effected, the mobile communication terminal performs two-way communication with the location-registered cell base station 104 through the receiver 205 and the transmitter 206 unless it re-enters the wide service area 101 (S410–S415). More specifically, if the terminal is outside the wide service area 101 (no at step S411) and within the same cell (yes at step S412), the receiver 205 intermittently receives a signal that is transmitted from the location-registered cell base station 104 in accordance with the intermittent reception power control by the power controller 216 (S410) unless there comes a transmission request (no at step S413). In the case of transmitting data (yes at step S413), the user operates the keypad 210, whereupon a fixed-form sentence or other data stored in the memory 208 is read out and sent to the transmitter 206 as a transmission signal $T_{CL}$, and finally transmitted to the location-registered cell base station 104 (S414). If the mobile communication terminal moves to an adjacent cell (no at step S412), an operation for location registration is performed with respect to the cell base station 104 of the adjacent cell (S415) in the same manner as described above and the above-described steps (S410–S415) are repeated. In this manner, the mobile communication terminal can receive data from the cell base station 104 rather than the wide area base station 102 as well as can transmit data when necessary.

As described above, while the cell receiver 205 is in an intermittent receiving state, the wide area receiver 202 intermittently receives a signal from the wide area base station 102 at all times (S411). If the terminal is still outside the wide service area 101 (no at step S411), the two-way communication state is maintained, that is, communication is performed with the location-registered cell base station 104 (S410–S415). On the other hand, if it is detected that the terminal has entered the wide service area 101 (yes at step S411), the processor 207 generates a communication termination notice and the transmitter 206 transmits it to the cell base station 104 concerned, whereby the communication with the cell base station 104 is finished (S416). The processor 207 then effects a transition to the intermittent receiving mode with the wide area receiver 202 (S402). A signal that is transmitted from the wide area base station 102 is intermittently received (S402–S407) until a transmitting operation becomes necessary (yes at step S406).

Two-way communication with a cell base station 104 is started in the same manner as described above (S408–S415) also when the reception message section $M_1$ includes a reply request code 301 (yes at step S406).

As described above, the mobile communication terminal has the function of always judging whether it exists within the wide service area 101. If the terminal is within the wide service area 101, an in intermittent receiving operation is performed by the wide area receiver 202. If it is detected that the terminal has moved outside the wide service area 101, a two-way communication with the nearest cell base station 104 is started and an operation for location registration is performed with respect to the cell base station 104. If it is detected that the terminal has moved into the wide service area 101 while a signal that is transmitted from the location-registered cell base station 104 is received intermittently, the communication with the cell base station 104 is finished and switching is made to the intermittent receiving channel with the wide area base station 102.

A channel switching control is also performed in the system management center 106 in link with the above-described communication operation of the mobile communication terminal.

Figure 5:
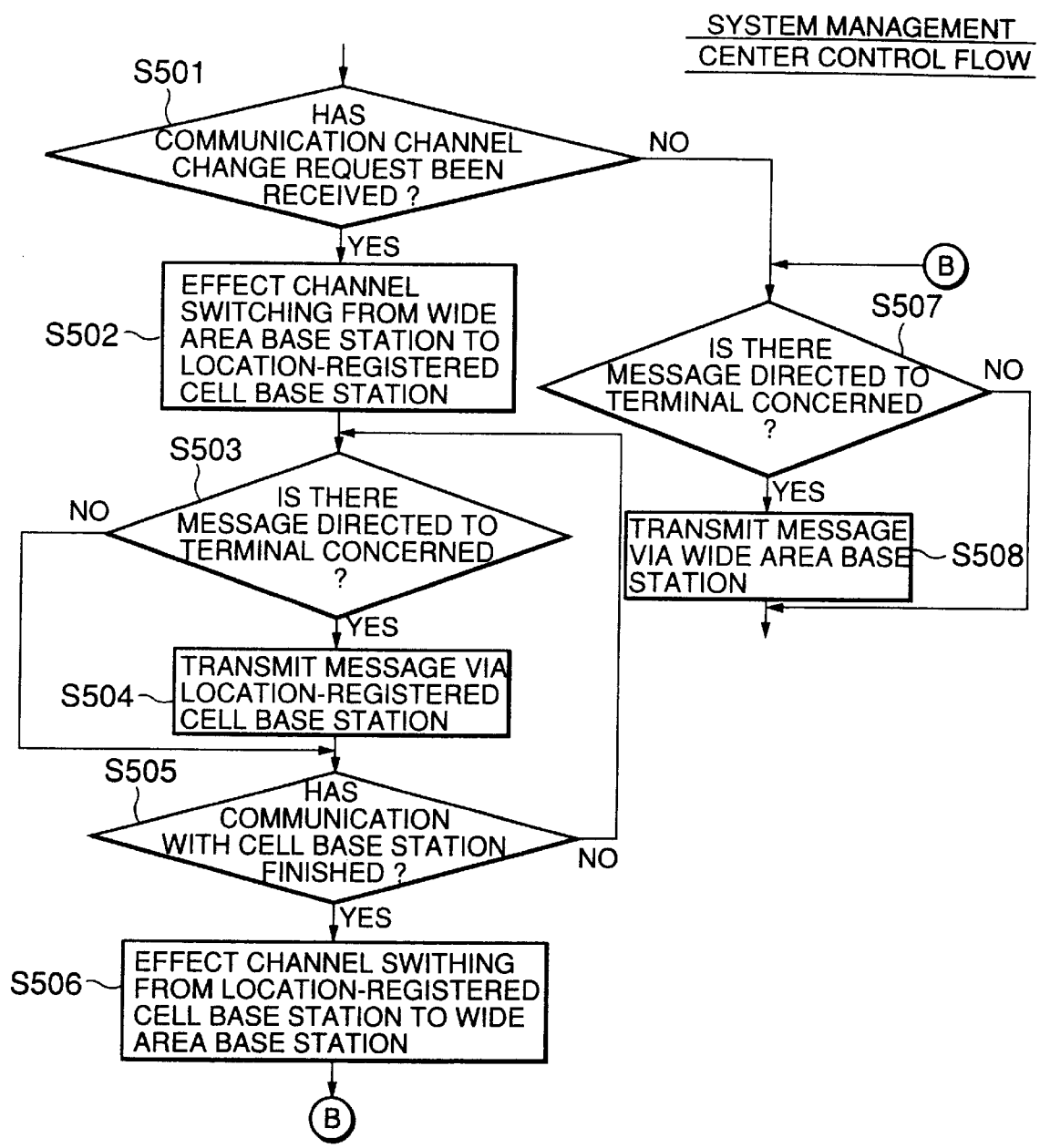
FIG. 5 is a flowchart showing an embodiment of a communication control operation of the system management center of the communication system according to the present invention.

FIG. 5 is a flowchart showing a communication control operation of the system management center 106 of the communication system according to the invention. As described above, when the mobile communication terminal moves out of the wide service area 101, location registration information including a communication change request is transmitted to the nearest cell base station 104. Upon reception of the location registration information, the cell base station 104 performs location registration of the mobile communication terminal concerned. At the same time, the cell base station 104 that has performed location registration in response to the communication change request from the mobile communication terminal is transmitted to the system controller 109 via the two-way communication controller 107 of the system management center 106.

When the system controller 109 has received a communication change request or a communication channel is disconnected (yes at step S501), the system controller 109 switches from the channel connecting the mobile communication terminal concerned to the wide area base station 102 to a channel connecting the mobile communication terminal to the location-registered cell base station 104 (S502). If the storage device 110 has data addressed to the mobile communication terminal concerned (yes at step S503), the system controller 109 causes the data to be transmitted to the mobile communication terminal via the location-registered cell base station 104 (S504). During the data transmission, the system controller 109 continues to monitor a two-way communication termination notice from the mobile communication terminal (S505). When the mobile communication terminal has moved into the wide service area 101 and a two-way communication termination notice has been received (yes at step S505), the system controller 109 switches from the channel connecting the mobile communication terminal to the cell base station 104 to a channel connecting the mobile communication terminal to the wide area base station 102. (S506).

Then, if the storage device 110 has data directed to the mobile communication terminal concerned (yes at step S507), the system controller 109 causes the data to be transmitted to the mobile communication terminal via the wide area base station 102 (S508). Step S507 is also executed when no communication change request has been received (no at step S501).

In the above embodiments, the processor 207 checks whether the mobile communication terminal concerned is within the wide service area 101 by using the error rate of a reception signal of its own group when receiving it. The wide service area check can be also performed in a similar manner by monitoring the electric field strength of a reception signal.

As described above in detail, according to the invention, during signal reception waiting, a signal that is transmitted from the wide area base station is received intermittently by using the wide area receiver that is low in power consumption. When the mobile communication terminal concerned has moved out of the wide service area or when data transmission has become necessary, two-way communication is performed with a cell base station having a cellular service area.

Therefore, the receiving process with relatively low power consumption is usually executed whereby the frequency of high power consumption processes such as the process of location registration with respect to a cell base station can be reduced. As a result, useless battery consumption can be reduced and hence the usable time can be elongated.

What is claimed is:

1. A mobile communication apparatus comprising:
a wide area receiver operating at relatively low power, for receiving a selective calling signal from a wide area base station that forms a wide one-way communication area;
a transceiver operating at higher power than the wide area receiver, for two-way communication with a nearest cell base station that forms a two-way communication area;
a determiner for determining whether the mobile communication apparatus exists within or outside the wide one-way communication area based on a received signal of the wide area receiver; and
a communication controller for causing the wide area receiver to operate at all times and causing the transceiver to start operating when the determiner determines that the mobile communication apparatus exists outside the wide one-way communication area.

2. The mobile communication apparatus according to claim 1, wherein the communication controller further causes the transceiver to start operating when the wide area receiver receives a message addressed to the mobile communication apparatus including a reply request.

3. The mobile communication apparatus according to claim 1, wherein the communication controller changes a communication channel from the wide area base station to the nearest cell base station by transmitting a channel change request to the nearest cell base station while operating the wide area receiver.

4. The mobile communication apparatus according to claim 3, wherein the communication controller changes a communication channel from the nearest cell base station to the wide area base station after disconnecting the communication with the nearest cell base station when the determiner determines that the mobile communication apparatus exists within the wide one-way communication area.

5. The mobile communication apparatus according to claim 1, wherein the communication controller starts location registration of the mobile communication apparatus in the nearest cell base station when the transceiver starts operating.

6. A mobile communication apparatus comprising:
a first receiver operating at relatively low power, for intermittently receiving a selective calling signal from a wide area base station that forms a wide one-way communication area;
a second receiver operating at higher power than the first receiver, for intermittent reception from a nearest cell base station that forms a two-way communication area;
a transmitter for transmission to the nearest cell base station;
a determiner for determining whether the mobile communication apparatus exists within or outside the wide one-way communication area based on a received signal of the first receiver; and
a communication controller for controlling such that the first receiver is caused to operate at all times and such that, when the determiner determines that the mobile communication terminal exists outside the wide one-way communication area, the transmitter is caused to transmit a location registration signal to the cell base station and, after location registration has been made, the second receiver is caused to intermittently receive a radio signal from the cell base station while operating the first receiver.

7. The mobile communication apparatus according to claim 6, wherein the communication controller further causes the transmitter to transmit the location registration signal to the cell base station when the first receiver receives a message addressed to the mobile communication apparatus including a reply request.

8. The mobile communication apparatus according to claim 6, wherein the communication controller changes a communication channel from the wide area base station to the nearest cell base station by transmitting a channel change request to the nearest cell base station while operating the wide area receiver.

9. The mobile communication apparatus according to claim 8, wherein the communication controller changes a communication channel from the nearest cell base station to the wide area base station after disconnecting the communication with the nearest cell base station when the determiner determines that the mobile communication apparatus exists within the wide one-way communication area.

10. A communication control method for a mobile communication apparatus, comprising the steps of:

driving a wide area receiver operating at relatively low power to receive a selective calling signal from a wide area base station that forms a wide one-way communication area at all times;

determining whether the mobile communication apparatus exists within or outside the wide one-way communication area based on a received signal of the wide area receiver; and starting a cell transceiver operating at higher power than the wide area receiver for two-way communication with a nearest cell base station that forms a two-way communication area, when the mobile communication apparatus exists outside the wide one-way communication area.

11. The communication control method according to claim 10, wherein the cell transceiver is started operating when the wide area receiver receives a message addressed to the mobile communication apparatus including a reply request.

12. The communication control method according to claim 10, wherein a communication channel is changed from the wide area base station to the nearest cell base station by transmitting a channel change request to the nearest cell base station while operating the wide area receiver.

13. The communication control method according to claim 12, wherein a communication channel is changed from the nearest cell base station to the wide area base station after disconnecting the communication with the nearest cell base station when the mobile communication apparatus exists within the wide one-way communication area.

14. The communication control method according to claim 10, wherein location registration of the mobile communication apparatus to the nearest cell base station is started when the cell transceiver is started operating.

15. A mobile communication system comprising:

a plurality of mobile terminals;

a one-way communication system where a wide area base station forms a wide one-way communication area;

a two-way communication system having a cellular service area which is formed by a plurality of cell base stations each forming a cellular two-way communication area; and a system controller connected to the one-way communication system and the two-way communication system, for controlling mobile communications in the wide one-way communication area and/or the cellular service area, wherein each of the a mobile terminals comprises:

a wide area receiver operating at relatively low power, for receiving a selective calling signal from the wide area base station;

a transceiver operating at higher power than the wide area receiver, for two-way communication with a nearest cell base station;

a determiner for determining whether the mobile terminal exists within or outside the wide one-way communication area based on a received signal of the wide area receiver; and a communication controller for causing the wide area receiver to operate at all times and causing the cell transceiver to start operating when the determiner determines that the mobile terminal exists outside the wide one-way communication area.

16. The mobile communication system according to claim 15, wherein the communication controller of the mobile terminal further causes the transceiver to start operating when the wide area receiver receives a message addressed to the mobile terminal including a reply request.

17. The mobile communication system according to claim 15, wherein the communication controller of the mobile terminal changes a communication channel from the one-way communication system to the two-way communication system by transmitting a channel change request to the nearest cell base station while operating the wide area receiver, and wherein the system controller changes a communication channel from the one-way communication system to the two-way communication system when receiving the channel change request from the mobile terminal through the nearest cell base station.

18. The mobile communication system according to claim 17, wherein the communication controller of the mobile terminal changes a communication channel from the two-way communication system to the one-way communication system after disconnecting the communication with the nearest cell base station when the determiner determines that the mobile communication apparatus exists within the wide one-way communication area, and wherein the system controller changes a communication channel from the two-way communication system to the one-way communication system when the communication between the nearest cell base station and the mobile terminal is disconnected.

* * * * *